A. SIMPSON.
SPRING WHEEL.
APPLICATION FILED MAY 24, 1915.
1,179,235.
Patented Apr. 11, 1916.
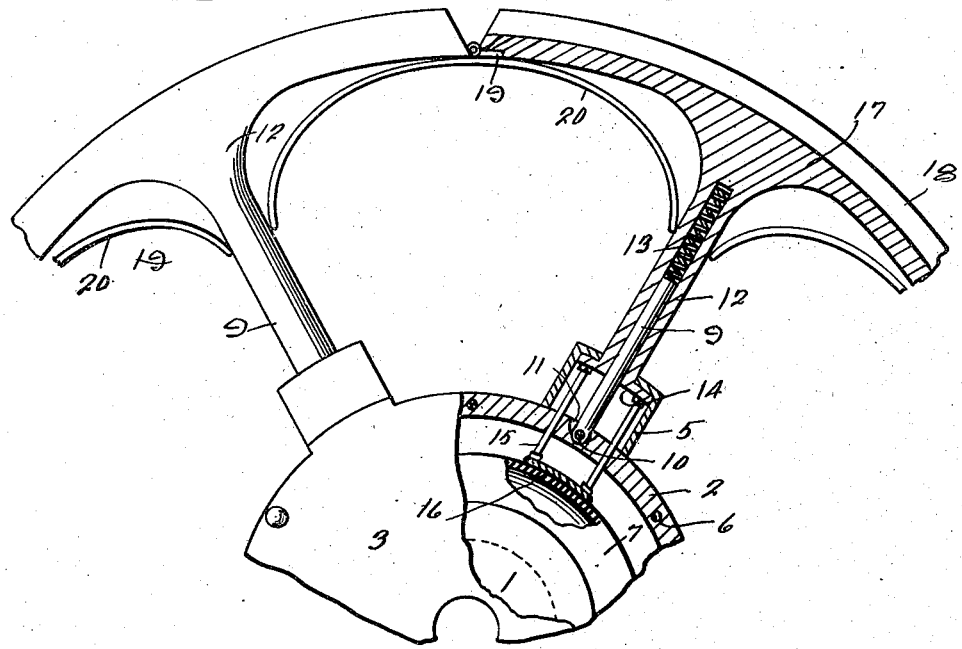
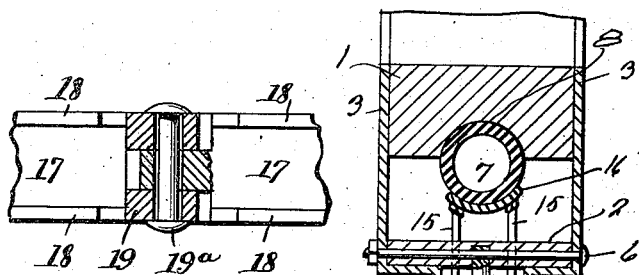
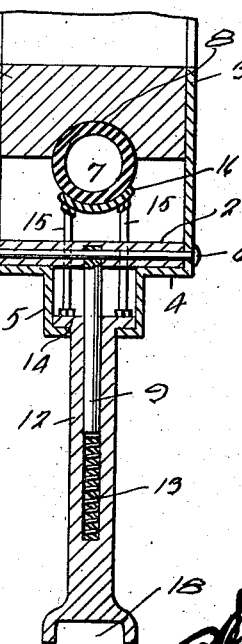
Witnesses
Chas. H. Trotter
J. W. Gainer
Inventor
A. Simpson
By [signature]
Attorney

UNITED STATES PATENT OFFICE.

ALEXANDER SIMPSON, OF MAPLETON, IOWA.

SPRING-WHEEL.

1,179,235.

Specification of Letters Patent. Patented Apr. 11, 1916.

Application filed May 24, 1915. Serial No. 30,178.

*To all whom it may concern:*

Be it known that I, ALEXANDER SIMPSON, a citizen of the United States, residing at Mapleton, in the county of Monona and State of Iowa, have invented certain new and useful Improvements in Spring-Wheels; and I do hereby declare the following to be a full, clear, and exact description of the invention, such as will enable others skilled in the art to which it appertains to make and use the same.

This invention is an improved spring wheel, adapted for use on automobiles and other vehicles, the object of my invention being to provide a spring wheel which enables the use of a pneumatic tire to be dispensed with, which absorbs shocks and greatly promotes the comfort of the persons in the car.

One object of the invention is to effect improvements in the construction of the spokes.

Another object is to provide improved means for cushioning the spokes.

Another object is to provide bracing springs which are arranged between the spokes and which serve to distribute stresses evenly between them.

The invention consists in the construction, combination and arrangement of devices hereinafter described and claimed.

In the accompanying drawings:—Figure 1 is partly an elevation and partly a sectional view of a portion of a spring wheel constructed in accordance with my invention. Fig. 2 is an inverted transverse sectional view of the same. Fig. 3 is a top plan view of fragmentary portions of the loosely connected ends of two of the spoke shoes, the hinge barrels being in horizontal section.

In the embodiment of my invention, I provide a hub 1, an inner rim 2 which is concentric with the hub and is spaced therefrom, plates 3 being secured on opposite sides of and connecting the hub and the inner rim, said plates have peripheral portions 4 which are provided with hollow radial guide arms 5, which in effect form inner spoke members. Bolts 6 secure the inner rim between the plates as shown. An inner pneumatic or other suitable elastic tire 7 is arranged in a peripheral groove 8 with which the hub is provided, and is also arranged in the annular chamber formed between the hub, the inner rim, and the plates 3.

Radially arranged plunger rods 9 have their inner ends pivotally mounted as at 10 in recesses 11 in the periphery of the inner rim 2 and at points corresponding with the centers of the guides 5. The spokes 12 are tubular, the plunger rods are arranged in the inner ends of the bores of the spokes and cushioning springs 13 which are shown as coiled springs are arranged in the spoke bores and bear between the bottoms of said bores and the outer ends of the plunger rods as shown. The spokes are provided with heads 14 at their inner ends which operate radially in the guides 5; the spokes extending through openings in the outer ends of the guides, and the heads are connected by rods 15 with curved plates 16 which bear on the outer side of the inner tire 7. Each spoke has a segmental shoe 17 at its outer end, the said shoe forming segmental members of the outer rim of the wheel and each being provided in its outer side with a channel to receive a segmental member 18 of an outer tire. A rubber or other suitable outer tire may be employed, as desired.

The outer tire members 18 are segmental and correspond in length with segmental spoke shoes 17. The spoke shoes 17 are loosely connected at their ends at points between the spokes by hinges 19. To permit of this loose connection, the pintles 19ª of the hinges 19 are, as shown in Fig. 3 of the drawings, afforded a moderate degree of play. Arcuate bracing strings 20 have their central portions secured to the said hinges and hence connected to the rim, the ends of said bracing springs bearing against the opposing sides of the spokes and serving to strengthen the construction of the wheel to spring and yield while enabling the wheel to spring and yield to concussion and to absorb shocks.

When the wheel is in use inward thrusts of the spokes are resisted both by the springs 13 and the inner elastic tire 7, so that the wheel is very resilient and absorbs shocks and enables the car on which it is used to ride smoothly and easily.

While I have herein shown and described a preferred form of my invention, I would have it understood that changes may be made in the form, proportion and construction of the several parts without departing from the spirit of the invention and within the scope of the appended claim.

Having thus described my invention, I claim:—

A wheel of the class described comprising a hub, an inner rim, an inner, elastic tire on the hub, radially arranged plunger rods connected at their inner ends to the rim, radially arranged guides also connected to and projecting outwardly from the inner rim, tubular spokes having heads arranged for radial movement in said guides, connections between said heads and the inner tire, segmental shoes at the outer ends of the tubular spokes, and a flexible rim or tire on the shoes of the spokes, the said plunger rod being arranged for radial movement in the bores of the spokes, and cushioning springs in the spoke bores and bearing against said plunger rods.

In testimony whereof I affix my signature in presence of two witnesses.

ALEXANDER SIMPSON.

Witnesses:
W. J. HANBRICH,
ROY A. JOHNS.

Copies of this patent may be obtained for five cents each, by addressing the "Commissioner of Patents, Washington, D. C."